United States Patent Office 3,177,250
Patented Apr. 6, 1965

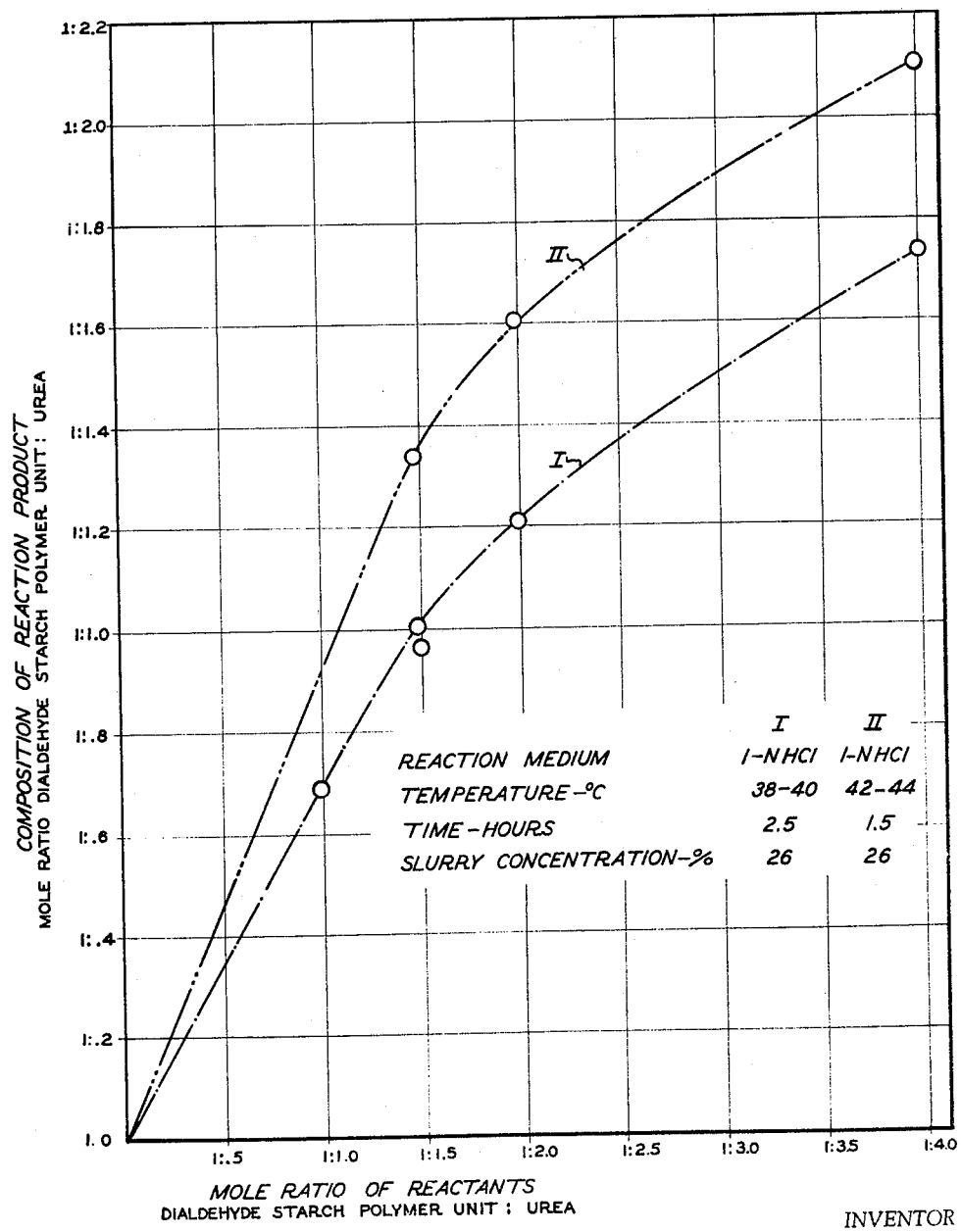
REACTION OF DIALDEHYDE
STARCH AND UREA
INVENTOR
PETER J. BORCHERT

3,177,250
DIALDEHYDE POLYSACCHARIDE-UREA DERIVATIVES
Peter J. Borchert, Elkhart, Ind., assignor to Miles Laboratories, Inc., Elkhart, Ind., a corporation of Indiana
Filed June 23, 1960, Ser. No. 38,248
9 Claims. (Cl. 260—553)

This invention relates to novel reaction products of urea and dialdehyde polysaccharides, also called periodate oxidized polysaccharides. More specifically, the present invention pertains to new polymers which are "polyglucosylolurea" compounds resulting from the reaction of varying proportions of urea with dialdehyde polysaccharides and to processes for making these compounds. This application is a continuation-in-part of Serial No. 771,190, filed November 3, 1958, now abandoned.

The reaction of dialdehyde polysaccharides with urea may proceed in one of two ways. If one mole of urea reacts per polymer unit of the dialdehyde polysaccharide the following reaction, shown in the case of dialdehyde starch, as Equation 1, takes place

EQUATION 1

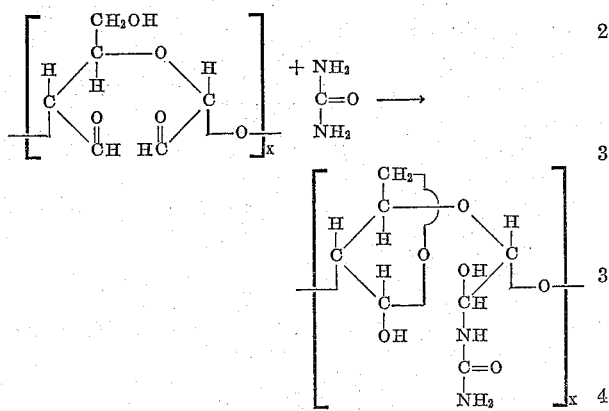

wherein $x$ stands for the number of repeating units in the molecule, which may vary from about twenty to as many as several thousand. If two moles of urea react per polymer unit of the dialdehyde polysaccharide the reaction shown in Equation 2 takes place

EQUATION 2

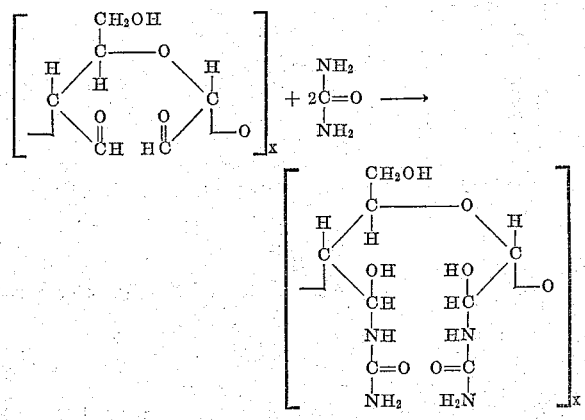

wherein $x$ has the same significance as above.

My copending application Serial No. 765,274, filed October 6, 1958, now U.S. Patent No. 3,001,979, demonstrates that a slurry of a dialdehyde polysaccharide in either an alcoholic or aqueous dispersion adds one mole of urea per mole of dialdehyde polysaccharide polymer unit at room temperature in 16 hours or at 40–70° C. in 1 to 3 hours. Under the mild reaction conditions of the processes described in that application only one of the two available carbonyl groups of the dialdehyde polysaccharide reacts with urea by addition. Heretofore it has not been possible to react two moles of urea per mole of dialdehyde polysaccharide polymer unit.

An object of this invention is to provide dialdehyde polysaccharide-urea derivatives which have any desired molar ratio of dialdehyde polysaccharide to urea.

Another object of this invention is to provide readily usable processes for the preparation of such products.

A particular object of this invention is to provide dialdehyde polysaccharide-urea compositions wherein each mole of dialdehyde polysaccharide polymer unit adds two moles of urea.

Another object of this invention is to provide a process for the preparation of dialdehyde polysaccharide-urea compositions having a mole ratio of dialdehyde polysaccharide polymer unit to urea of 1:2.

A further object of this invention is to provide a process for the preparation of dialdehyde polysaccharide-urea compositions which is capable of converting dialdehyde polysaccharides to dialdehyde polysaccharide-urea compositions under relatively mild reaction conditions.

Yet a further object of this invention is to provide a novel reaction system for converting dialdehyde polysaccharides to dialdehyde polysaccharide-urea compositions.

Other objects and advantages of this invention will become apparent in the course of the following detailed disclosure and description.

It has now been found that dialdehyde polysaccharides can be reacted with urea in a slurry reaction using either an aqueous or aqueous organic dispersion medium in the presence of a strong acidic catalyst. Depending upon the mole ratio of dialdehyde polysaccharide to urea in the reaction medium, various compositions may be obtained ranging from those in which only a small percentage of the aldehyde groups of the dialdehyde polysaccharide have reacted with urea to those wherein two moles of urea have reacted per mole of dialdehyde polysaccharide polymer unit. The way in which the composition of the product varies depending upon the composition of the reaction medium can be best illustrated by reference to the drawing included herein which shows how decreasing molar ratios of dialdehyde polysaccharide polymer unit to urea in the reactants result in decreasing molar ratios of dialdehyde polysaccharide polymer unit to urea in the products. The drawing also shows the effect of the use of a higher temperature using the same reactant mole ratios.

For preparing the dialdehyde polysaccharide-urea compositions or derivatives of this invention any dialdehyde polysaccharide may be used. These dialdehyde polysaccharides may be conveniently prepared by the periodate oxidation of polysaccharides or by the electrolytic procedure disclosed in U.S. Patent No. 2,713,553 to Charles L. Mehltretter, if desired. The dialdehyde polysaccharides to be used in this process may be the dialdehyde derivatives of any polysaccharide such as corn, wheat, tapioca or potato starches, celluloses, dextrans, algins, inulin or others. Of these polysaccharides the dialdehyde derivatives of starch, known generically as dialdehyde starch, are the best known and most widely used. However, where it is desired to have derivatives of other polysaccharides, these may also be used.

In general, it is preferred to use dialdehyde polysaccharides which are from about 70% to 100% oxidized, that is, those wherein 70 to 100 of each 100 of the original anhydroglucose units of the polysaccharide have been converted to dialdehyde units, such as by periodate oxidation.

In accordance with the inventive concept a slurry of a dialdehyde polysaccharide in a concentration of from about 15% to 40% by weight and preferably from about 20% to 30% by weight either in aqueous or aqueous organic slurry is reacted with the desired proportion of urea. An excess of the stoichiometric amount of urea is used to insure that the desired degree of conversion takes place. In general, an excess of from about 10% to 250% is effective to produce the desired compositions. A larger excess is found to have little or no added effect presumably because all of the available carbonyl groups will have reacted with urea at about this level.

For the purpose of forming a slurry of the dialdehyde polysaccharide and urea, any of the lower water miscible alcohols such as methanol, ethanol, n-propanol, isopropanol, t-butanol, etc. or any other compatible organic solvent such as ketones, for example acetone and methyl ethyl ketone, etc., or water itself may be satisfactorily utilized as the dispersion medium. However, where organic solvents are used it has been found that the best results are obtained if a minimum of about 20% by weight of water is used in conjunction with the organic solvent. It is possible to conduct the reaction using a non-aqueous solvent but this reaction goes only to a minimum mole ratio of dialdehyde polysaccharide polymer unit to urea of about 1:1.

The acidic catalysts which make possible the provision of the dialdehyde polysaccharide-urea compositions of this invention and more particularly those having greater quantities of urea reacted with the dialdehyde polysaccharide than the 1:1 molar ratio of dialdehyde polysaccharide polymer unit to urea compositions may be any strong acid. Especially useful are mineral acids such as hydrochloric acid and sulfuric acid. Other strong acids such as phosphoric acid may also be used. In general, the acid is used in a concentration of from about 0.5 N to 2 N and preferably about 1 N. Lesser concentrations are not effective enough to be practical. Higher concentrations than about 2 N are not recommended because of possible degradation of the dialdehyde polysaccharide.

The relatively mild reaction conditions made possible by the discovery that the reaction between the dialdehyde polysaccharide and urea could be catalyzed by means of a strong acid permit recovery of satisfactory yields of dialdehyde polysaccharide-urea derivatives having the desired composition at temperatures of from about 30° C. to 70° C. and with reaction times of from about 1 to 3 hours.

Recovery of the dialdehyde polysaccharide-urea derivatives provided in accordance with this invention may be accomplished through the steps of direct filtration, washing and drying. For washing, water, methanol or acetone has been found particularly effective. Other solvents may, of course, be used if desired. Drying may be accomplished by heating the amorphous white powder obtained by the reaction of the dialdehyde polysaccharide and urea in an oven at a temperature of from about 60° C. to 70° C. for several hours. The product thereby recovered is found to show no crystalline material under microscopic examination, thereby attesting to the absence of any degradation of the dialdehyde polysaccharide.

The products of the process herein described are found to have various properties depending upon the degree of substitution of the urea upon the dialdehyde polysaccharide. Those derivatives wherein a smaller proportion of urea is reacted with the dialdehyde polysaccharide, that is those wherein the mole ratio of dialdehyde polysaccharide polymer unit to urea is 1:1 or higher are found to be soluble in alkali, because of the availability of unreacted carbonyl groups whereas those wherein a greater proportion of the carbonyl groups have been substituted with urea, for example, the 1:2 derivative show no alkali solubility at ordinary temperatures.

The dialdehyde polysaccharide-urea derivatives of this invention are useful in various applications. In the plastics industry, for example, they can be used as molding powders. In the textile industry they can be used in various textile treatments such as for the preparation of crease-proof and crush-proof fabrics. In addition, they are useful in the paper, adhesives and laminating industries, and may also find application as valuable chemical intermediates.

The invention will be better understood by reference to the following examples which are included for purposes of illustration, and are not to be construed as in any way limiting the scope of this invention which is defined in the claims appended hereto.

*Example I*

A slurry containing a mixture of 48 g. dialdehyde starch (73.3% oxidation, 14.7% moisture), 0.19 mole, with 46.8 g. urea, 0.78 mole, dissolved in a mixture of 25 ml. water and 100 ml. methanol, and 2 ml. 50% sulfuric acid was heated under continuous stirring in a flask equipped with a reflux condenser at 40° C. to 50° C. for two hours. It was then cooled, filtered and washed with methanol-water (1:1) and finally with acetone and dried in a vacuum stove at 40° C. for 24 hours. Then it was dehydrated with toluene charged to a flask attached to a Stark and Dean trap, which was attached to a reflux condenser. The product was insoluble in cold, dilute alkali. Yield: 60 g. (98–100% of theory). Analysis— Calculated for a 1.46% moisture-containing dehydrated product obtained from a 73.3% oxidized starting material: N, 15.3%. Found: N, 15.1%.

This example shows that the di-urea derivatives of dialdehyde polysaccharides can be prepared according to the process of this invention.

The following example illustrates the use of an aqueous reaction medium for preparing a dialdehyde polysaccharide-urea derivative.

*Example II*

A slurry containing a mixture of 24 g. dialdehyde starch (73.3% oxidation, 14.7% moisture), 0.09 mole, with 24 g. urea, 0.4 mole, 100 ml. water, and 1 ml. 50% sulfuric acid was heated under stirring in a flask equipped with a reflux condenser at 60° C. to 70° C. for 1½ hours to 2 hours. It was then cooled and after addition of 100 ml. of methanol the resulting mixture was filtered, washed with methanol and finally with acetone. The white powder obtained was dried at 60° C. to 70° C. for 30 minutes. The product was insoluble in cold, dilute alkali. Yield: 36 g. (100% of theory). Analysis— Calculated for a 4.31% moisture-containing urea polymer obtained from a 73.3% oxidized starting material: N, 14.0%. Found: N, 13.9%.

This example shows that an aqueous medium can be used for reaction as advantageously as an aqueous organic reaction medium.

The following example illustrates that the reaction for preparation of the dialdehyde polysaccharide-urea derivatives can be conducted at room temperature.

*Example III*

To a flask equipped with stirrer and thermometer containing 120 ml. methanol-water (1:2) there was added 73 g. urea, 1.19 moles, which promptly dissolved. Then 50 g. of dialdehyde starch (91.2% oxidation, 7.1% moisture), 0.26 mole, was added and the resulting slurry continuously stirred for a few minutes. Upon addition of 2 ml. 50% sulfuric acid dissolved in 5 ml. methanol the temperature rose from 30° C. to 40° C. The reaction mixture was then filtered, washed with methanol and finally with acetone. After standing for 24 hours at room temperature, the yield was 72 g. (92% of theory). The product was insoluble in cold, dilute alkali. Analysis— Calculated for a 6.1% moisture-containing product obtained from a 91.2% oxidized starting material: N, 16.8%. Found: N, 16.4%.

This example shows that an almost quantative yield is obtained according to the process of this invention even without the use of higher temperatures.

The following example illustrates the preparation of a dialdehyde polysaccharide-urea composition having a mole ratio of dialdehyde polysaccharide polymer unit to urea of 1:1 using a hydrochloric acid catalyst.

*Example IV*

A slurry containing a mixture of 200 g. dialdehyde starch (91.0% oxidation, 8% moisture), 1.04 moles, with 92 g. urea, 1.55 moles, 450 ml. water, and 50 ml. concentrated hydrochloric acid was heated on a water bath at 38° C. to 40° C. for 2½ to 3 hours. At the end of this time the resulting mixture was cooled to 30° C., filtered, washed with 300–600 ml. water and finally with 250 ml. acetone. The solid, white product was dried by sucking air at 65° C. to 70° C. through a suction filter to constant weight. Yield: 243 g. Theoretical yield: 247 g. (mole ratio 1:1 based on anhydrous material). Analysis—Calculated for a 5% moisture-containing product obtained from a 91% oxidized starting material: N, 11.3%. Found: N, 9.9%.

These data show that a product having a mole ratio of dialdehyde polysaccharide polymer unit to urea of 1:0.9 can be obtained according to the process of this invention using relatively mild reaction conditions.

The following example illustrates the corresponding preparation of a dialdehyde polysaccharide-urea composition having a mole ratio of dialdehyde polysaccharide polymer unit to urea of 1:2.

*Example V*

A slurry containing a mixture of 200 g. dialdehyde starch (91% oxidation, 8% moisture), 1.04 moles, with 248 g. urea, 4.16 moles, 450 ml. water, and 50 ml. concentrated hydrochloric acid was stirred for 16 hours at room temperature (27° C.) followed by 30 minutes of heating at 40° C. The resulting reaction mixture was then cooled to 30° C., filtered washed with 400 to 600 ml. water and finally with 400 ml. acetone. The solid, white product was dried by sucking air at 65° C. to 70° C. through a suction filter to constant weight. Yield: 296 g. Theoretical yield: 307 g. (mole ratio 1:2 based on anhydrous material). Analysis—Calculated for a 5% moisture-containing product obtained from a 91% oxidized starting material: N, 18.1%. Found: N, 18.8%.

This example indicates that products containing a mole ratio of dialdehyde polysaccharide polymer unit to urea of as low as about 1:2.1 can be obtained according to the process of this invention although it would appear that a ratio of 1:2 would be the limiting ratio. The 1:2.1 ratio may be explained by the fact that the end groups of the dialdehyde polysaccharide are also capable of reaction with urea.

Additional experiments using various ratios of dialdehyde polysaccharide polymer unit to urea have been carried out and the results of a series of such experiments is shown graphically in the drawing included herein. It may be seen that depending upon the reaction conditions the variation of mole ratio of reactants produces a like variation in the ratio of dialdehyde polysaccharide polymer unit to urea in the products obtained.

In summary, the instant invention relates to a process for the preparation of dialdehyde polysaccharide-urea compositions ranging in composition from those wherein only a small percentage of the available carbonyl groups of the dialdehyde polysaccharide have been reacted with urea to those wherein the mole ratio of dialdehyde polysaccharide polymer unit to urea is about 1:2. The process comprises slurrying the dialdehyde polysaccharide in an aqueous or aqueous organic dispersion medium and reacting the thus slurried dialdehyde polysaccharide with an excess of urea in the presence of a catalytic amount of a strong mineral acid. Additionally, this invention provides the hitherto unobtainable dialdehyde polysaccharide-urea derivative wherein the mole ratio of dialdehyde polysaccharide polymer unit to urea is about 1:2.

What is claimed is:

1. A dialdehyde polysaccharide-urea composition having a mole ratio of dialdehyde polysaccharide polymer unit to urea of about 1:2 and having units of the formula:

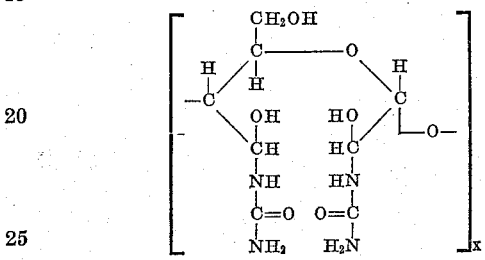

wherein $x$ represents the number of repeating units in the molecule.

2. A composition according to claim 1 wherein the dialdehyde polysaccharide is dialdehyde starch.

3. A process for the preparation of a dialdehyde polysaccharide-urea composition which comprises reacting in slurry a dialdehyde polysaccharide with urea in an excess of from about 10% to 250% of the stoichiometric amount of urea in an aqueous dispersion medium, said dispersion medium containing therein a strong mineral acid in a concentration of from about 0.5 N to 2 N and recovering the dialdehyde polysaccharide-urea composition thereby obtained.

4. A process for the preparation of a dialdehyde polysaccharide-urea composition which comprises reacting in slurry a dialdehyde polysaccharide with urea in an excess of from about 10% to 250% of the stoichiometric amount of urea in a medium comprising a water miscible organic solvent and a minimum of about 20% by weight of water, said dispersion medium containing therein a strong mineral acid in a concentration of from about 0.5 N to 2 N and recovering the dialdehyde polysaccharide-urea composition thereby obtained.

5. A process according to claim 3 wherein the mineral acid is hydrochloric acid.

6. A process according to claim 3 wherein the mineral acid is sulfuric acid.

7. A process according to claim 3 wherein the dialdehyde polysaccharide is dialdehyde starch.

8. A process according to claim 3 wherein the concentration of mineral acid is about 1 N.

9. A process according to claim 3 wherein the dialdehyde polysaccharide is present in the slurry in a concentration of from about 15% to 40% by weight of the slurry.

References Cited in the file of this patent

UNITED STATES PATENTS

| | | |
|---|---|---|
| 2,634,261 | Fetterly | Apr. 7, 1953 |
| 2,725,362 | Gaver et al. | Nov. 29, 1955 |
| 2,886,542 | Kremer | May 12, 1959 |
| 2,916,371 | O'Donnell | Dec. 8, 1959 |
| 3,001,979 | Borchert | Sept. 26, 1961 |
| 3,009,889 | Borchert | Nov. 21, 1961 |

UNITED STATES PATENT OFFICE
CERTIFICATE OF CORRECTION

Patent No. 3,177,250                                        April 6, 1965

Peter J. Borchert

It is hereby certified that error appears in the above numbered patent requiring correction and that the said Letters Patent should read as corrected below.

Column 3, line 36, for "0.5 N" read -- 0.1 N --; column 4, line 18, for "73.3%" read -- 75.58% --; same line 18, for "14.7%" read -- 13.95% --; same line 18, for "0.19" read -- 0.195 --; line 23, after "hours." insert -- This slurry mixture contained 100% excess urea based on the stoichiometry for a product having a dialdehyde starch: urea mole ratio of 1:2. This slurry also contained sulfuric acid in a concentration of 0.2 N. --; line 29, for "98-100%" read -- 93% --; line 31, after "product" insert -- (containing dialdehyde starch: urea in 1:2 mole ratio) --; same line 31, for "73.3%" read -- 75.58% --; line 32, for "15.3%" read -- 16.6% --; same line 32, after "15.1%." insert -- The amount of nitrogen found in the product indicates that the product has a dialdehyde starch: urea mole ratio of 1:1.82. --; line 46, after "2 hours." insert -- This slurry mixture contained 113% excess urea based on the stoichiometry for a product having a dialdehyde starch: urea mole ratio of 1:2. This slurry also contained sulfuric acid in a concentration of 0.1 N. --; line 53, after "mer" insert -- (containing dialdehyde starch: urea in 1:2 mole ratio) --; same column 4, line 54, for "14.0%" read -- 15.9% --; same line 54, after "13.9%." insert -- The amount of nitrogen found in the product indicates that the product has a dialdehyde starch: urea mole ratio of 1:1.75. --; line 64, for "120 ml. methanol-water (1:2) there was" read -- 125 ml. methanol-water (1:2.3) there were --; line 65, for "1.19" read -- 1.22 --; line 67, for "was" read -- were --; line 68, after "minutes." insert -- This slurry mixture contained 130% excess urea based on the stoichiometry for a product having a dialdehyde starch: urea mole ratio of 1:2. --; line 70, after "40° C." insert -- The resulting slurry mixture contained sulfuric acid in a concentration of 0.1 N. Without further heating, the stirring was continued for 3 hours between 30° C. and 40° C. --; same column 4, line 75, for "6.1% moisture-containing product"

3,177,250 read -- 1.9% moisture-containing product (containing dialdehyde starch: urea in 1:2 mole ratio) --; column 5, line 1, for "16.8%" read -- 18.6% --; line 2, for "16.4%." read -- 15.4%. The amount of nitrogen found in the product indicates that the product has a dialdehyde starch: urea mole ratio of 1:1.66. --; line 3, for "quantative" read -- quantitative --; same column 5, line 41, after "40° C." insert -- This slurry mixture contained 100% excess urea based on the stoichiometry for a product having a dialdehyde starch: urea mole ratio of 1:2. This slurry also contained hydrochloric acid in a concentration of 1.52 N. --; column 6, line 32, after "composition" insert -- having a mole ratio of dialdehyde polysaccharide polymer unit to urea of about 1:2 --; line 33, for "an" read -- a molar --; line 34, for "from about 10% to 250%" read -- at least about 100% --; line 35, after "medium" insert -- at a temperature of from about 30° C. to about 70° C. --; line 37, for "0.5" read -- 0.1 --; line 41, after "composition" insert -- having a mole ratio of dialdehyde polysaccharide polymer unit to urea of about 1:2 --; line 42, for "an" read -- a molar --; line 43, for "from about 10% to 250%" read -- at least about 100% --; line 44, before "medium" insert -- dispersion --; line 45, after "water" insert -- at a temperature of from about 30° C. to about 70° C. --; same column 6, line 47, for "0.5" read -- 0.1 --.

Signed and sealed this 15th day of February 1966.

(SEAL)
Attest:

ERNEST W. SWIDER
Attesting Officer

EDWARD J. BRENNER
Commissioner of Patents